(12) United States Patent
Platus

(10) Patent No.: US 9,327,847 B2
(45) Date of Patent: May 3, 2016

(54) THERMAL STRAPS FOR SPACECRAFT

(75) Inventor: David L. Platus, Santa Monica, CA (US)

(73) Assignee: MINUS K. TECHNOLOGY, INC., Inglewood, CA (US)

( * ) Notice: Subject to any disclaimer, the term of this patent is extended or adjusted under 35 U.S.C. 154(b) by 646 days.

(21) Appl. No.: 13/587,207

(22) Filed: Aug. 16, 2012

(65) Prior Publication Data

US 2014/0048240 A1 Feb. 20, 2014

(51) Int. Cl.
*F28F 7/00* (2006.01)
*B64G 1/50* (2006.01)
*F28F 13/00* (2006.01)
*B64G 1/22* (2006.01)

(52) U.S. Cl.
CPC ............ *B64G 1/50* (2013.01); *B64G 2001/228* (2013.01); *F28F 7/00* (2013.01); *F28F 2013/005* (2013.01)

(58) Field of Classification Search
CPC ... F16F 15/02; F16F 15/1217; F16F 15/1219; F28F 9/26; B23Q 1/36; F25D 19/006; B64G 1/50
USPC .............................................. 165/67, 69, 185
See application file for complete search history.

(56) References Cited

U.S. PATENT DOCUMENTS

| | | | | |
|---|---|---|---|---|
| 4,273,183 A * | 6/1981 | Altoz et al. | ................... | 165/277 |
| 4,281,708 A * | 8/1981 | Wing et al. | .................... | 165/277 |
| 4,454,910 A * | 6/1984 | Miyazaki | ....................... | 165/276 |
| 4,676,300 A * | 6/1987 | Miyazaki | ....................... | 165/276 |
| 4,869,068 A * | 9/1989 | Van Vloten | .................... | 62/51.1 |
| 5,178,357 A | 1/1993 | Platus et al. | | |
| 5,310,157 A | 5/1994 | Platus | | |
| 5,370,352 A | 12/1994 | Platus | | |
| 5,390,892 A * | 2/1995 | Platus | ........................... | 248/619 |
| 5,549,270 A | 8/1996 | Platus et al. | | |
| 5,628,195 A * | 5/1997 | Hill et al. | ........................ | 62/51.1 |
| 5,669,594 A | 9/1997 | Platus et al. | | |
| 5,794,909 A | 8/1998 | Platus et al. | | |
| 5,833,204 A | 11/1998 | Platus et al. | | |
| 6,676,101 B2 | 1/2004 | Platus | | |
| 8,132,773 B1 | 3/2012 | Platus | | |

* cited by examiner

*Primary Examiner* — Tho V Duong
(74) *Attorney, Agent, or Firm* — Fulwider Patton LLP

(57) ABSTRACT

Negative-stiffness-producing mechanisms can be incorporated with structural devices that are used on spacecraft that provide thermal coupling between a vibrating source and a vibration-sensitive object. Negative-stiffness-producing mechanisms can be associated with a flexible conductive link (FCL) or "thermal strap" or "cold strap" to reduce the positive stiffness of the FCL. The negative-stiffness-producing mechanism can be loaded so as to create negative stiffness that will reduce or negate the natural positive stiffness inherent with the FCL. The FCL will still be able to provide maximum thermal conductance while achieving low or near-zero stiffness to maximize structural decoupling.

19 Claims, 8 Drawing Sheets

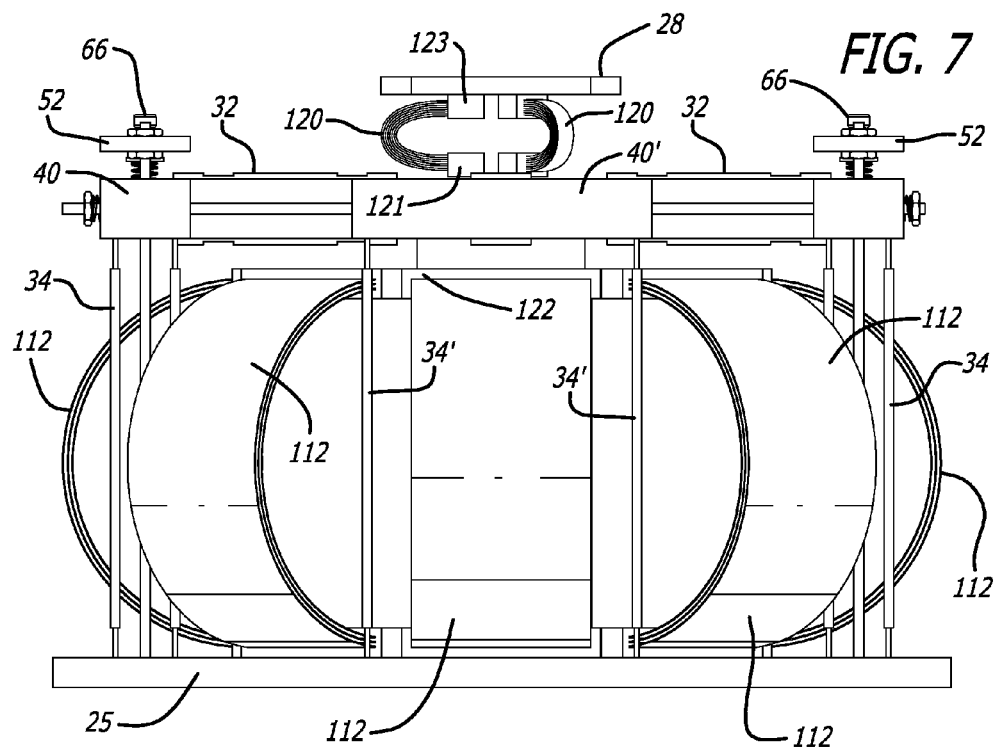
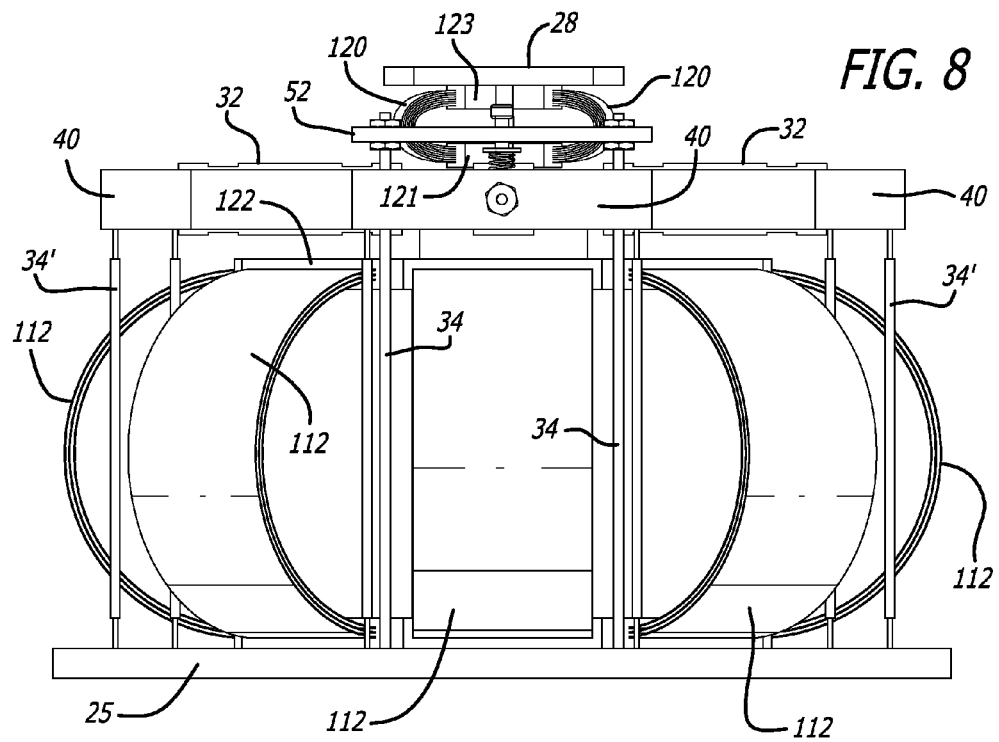

THERMAL STRAPS FOR SPACECRAFT

BACKGROUND OF THE INVENTION

This invention relates generally to improved designs of devices used on spacecraft and commonly referred to as thermal straps or cold straps or flexible conductive links (FCLs) for providing thermal (conductive) coupling and structural decoupling between cryogenic components such as a vibrating cooling source and a motion-sensitive element. The present invention provides means for reducing the stiffness of thermal straps through the use of negative-stiffness mechanisms thereby improving their structural decoupling. In the subsequent discussions, the terms thermal strap, FCL and cold strap are used interchangeably. Also, the combination of negative-stiffness mechanisms with a thermal strap or an FCL or a cold strap will be referred to as a "negative-stiffness thermal strap (NS thermal strap)" or a "negative-stiffness FCL (NSFCL)" or a "negative-stiffness cold strap (NS cold strap)."

My previous inventions utilized negative-stiffness mechanisms to provide vibration isolation systems capable of supporting an object having weight (an object with mass in a gravitational field) and providing low stiffness and low natural frequencies in both the vertical (gravity) direction and in the lateral or horizontal directions. The low horizontal stiffness and low horizontal natural frequencies were achieved by using the weight of the object to load vertically oriented beam-columns close to their critical buckling loads (the loads at which their lateral stiffness becomes zero). This approach made use of the "beam-column" effect, which refers to the reduction in the bending stiffness of a beam when it is loaded in compression to make the beam behave as a beam-column. It can be shown that the beam-column effect in a vertically oriented beam-column is equivalent to a horizontal spring and a negative-stiffness mechanism, and the magnitude of the negative stiffness increases with an increase in the weight load. The low vertical stiffness and low vertical natural frequency was achieved by using a support spring connected to a negative-stiffness mechanism in the form of horizontally oriented beam-columns which are spring loaded in compression so that the negative stiffness removes much of the stiffness of the support spring and the stiffness of the beam-columns. These vibration isolation systems are used to isolate vibration-sensitive objects from the vertical and horizontal vibrations of a vibrating support, i.e., to reduce the magnitude of the vibrations transmitted from the vibrating support to the object.

My previous vibration isolation systems are described in U.S. Pat. No. 5,530,157, entitled "Vibration Isolation System" issued May 10, 1994, U.S. Pat. No. 5,370,352, entitled "Damped Vibration System" issued Dec. 6, 1994, U.S. Pat. No. 5,178,357, entitled "Vibration Isolation System" issued Jan. 12, 1993, U.S. Pat. No. 5,549,270, entitled "Vibration Isolation System" issued Aug. 27, 1996, U.S. Pat. No. 5,669,594, entitled "Vibration Isolation System" issued Sep. 23, 1997, U.S. Pat. No. 5,833,204, entitled "Radial Flexures, Beam-Columns and Tilt Isolation for a Vibration Isolation System issued Nov. 10, 1998, which are all hereby incorporated by reference in this present application. These vibration isolators exhibit low stiffness, and low fundamental resonant frequencies, high damping to limit resonant responses of the composite system, effective isolation at the higher frequencies, and can provide high isolator internal resonant frequencies.

These above-described isolators provide excellent systems for isolating or reducing the transmission of vibratory motion between an object and the base by exhibiting low stiffness and low fundamental resonant frequencies and effective isolation at the higher frequencies while being capable of accommodating different weight loads without significantly degrading isolation system performance.

Many spacecraft rely on devices, commonly referred to as thermal straps or flexible conductive links (FCLs) or cold straps for providing thermal (conductive) coupling and structural decoupling between cryogenic components such as a cryocooler cooling source and an infrared (IR) detector or focal plane array (FPA) having highly critical alignment requirements. A critical tradeoff in the design of the thermal strap is maximizing the thermal conductance, which improves the overall performance of the thermal strap, and maximizing the structural decoupling which requires minimizing the stiffness. These design factors present conflicting design goals to the spacecraft engineer. It would therefore be beneficial if a thermal strap or other coupling device could attain maximum thermal conductance while at the same time maximizing structural decoupling in order to effectively isolate vibrations from the motion-sensitive equipment. The present invention solves these and other needs.

SUMMARY OF THE INVENTION

My present invention provides a means for reducing the vibrations or forces transmitted from a vibrating source on the spacecraft to a vibration-sensitive object on the spacecraft through a connection that has its stiffness reduced through the use of negative-stiffness mechanisms, and in particular, the thermal strap or cold strap or FCL between a vibrating cooling source such as a cryocooler and a motion-sensitive element such as an infrared (IR) detector or focal plane array (FPA) having highly critical alignment requirements.

For example, in one aspect of the present invention, the negative-stiffness-producing mechanism can create negative stiffness that will reduce or negate the natural positive stiffness inherent with the FCL. In this manner, the FCL will still be able to provide maximum thermal conductance while achieving low or near-zero stiffness to maximize structural decoupling. Accordingly, the combination of the negative-stiffness-producing mechanism with the FCL offers a means for improving the performance of the FCL by improving its structural decoupling without decreasing its thermal conductance, or improving its thermal conductance without degrading its structural decoupling.

In one aspect of the present invention, negative-stiffness mechanisms are coupled with an FCL producing a negative-stiffness FCL or NSFCL that is used to couple the vibration-sensitive object and the vibrating source in the spacecraft. The FCL consists of two FCLs in series, a first FCL and a second FCL. The first FCL is coupled with negative-stiffness mechanisms that remove much or all of the stiffness of the first FCL in an axial direction and in any transverse direction relative to the axial direction. This first FCL is relatively stiff in tilt, or rotation about any transverse axis, and is connected in series with a second FCL that provides thermal coupling and structural decoupling in the tilt directions. This second FCL can be relatively stiff in the axial direction and in the transverse directions since the low or zero axial and transverse stiffnesses of the first FCL effectively removes most or all of the axial and transverse vibrations or forces transmitted through the first FCL. Accordingly, the first FCL can be designed for higher thermal conductance so that the combined FCL, consisting of the first and second FCL in series, will provide effective thermal coupling, and the low or zero axial and transverse stiffness of the first FCL in combination with the low tilt stiffness of the second FCL will provide effective structural decoupling in the axial, transverse and tilt directions. The second FCL that provides the low tilt stiffness and structural decoupling for the tilt axes does not have the benefit of negative stiffness to reduce the tilt stiffness. However, with the higher thermal conductance that can be achieved in the first FCL for the same or lower axial and transverse stiffnesses, the thermal conductance of the second FCL can be made lower to allow for a lower tilt stiffness so that the combined FCLs will provide improved thermal coupling with the same structural decoupling or improved structural decoupling with the same thermal coupling, or both improved thermal coupling and structural decoupling compared with conventional FCL designs.

In another aspect of the present invention, the first and the second FCLs can each be made with a plurality of FCLs.

In one aspect of the present invention, the axial-negative-stiffness-producing mechanism utilizes compressed transversely-oriented flexures that cancel or nearly cancel the axial stiffness of the NSFCL. The inner ends of the flexures can be attached to a central hub that connects the first and second FCLs and provides effective thermal coupling between them. The transverse negative-stiffness-producing mechanism utilizes compressed axially oriented beam-columns that cancel or nearly cancel the transverse stiffness of the NSFCL. In this particular embodiment of the invention, the axially-oriented beam-columns are, in turn, attached to a base structure and a portion of the axial-negative-stiffness-producing mechanism. The base structure is attached to the vibrating cooling source and the NSFCL.

All in all, the present invention provides a suitable stiffness reducing system that will reduce the transmission of vibrations or forces from a vibrating source on the spacecraft to a vibration-sensitive object on the spacecraft through a connection such as a thermal strap that has its stiffness reduced through the use of negative-stiffness mechanisms. This reduction in stiffness can be performed with little or no reduction in the thermal coupling. This system can also provide better thermal coupling without reducing the structural decoupling as well as better thermal coupling and better structural decoupling compared with conventional thermal straps. Other features and advantages of the present invention will become apparent from the following detailed description when taken in conjunction with the accompanying drawings which illustrate, by way of example, the principles of the present invention.

BRIEF DESCRIPTION OF THE DRAWINGS

FIG. 7 is an elevational view of the negative-stiffness thermal strap shown in FIG. 4;

FIG. 8 is side elevational view of the negative-stiffness thermal strap shown in FIG. 4;

DETAILED DESCRIPTION OF THE PREFERRED EMBODIMENTS

Figure 1A:
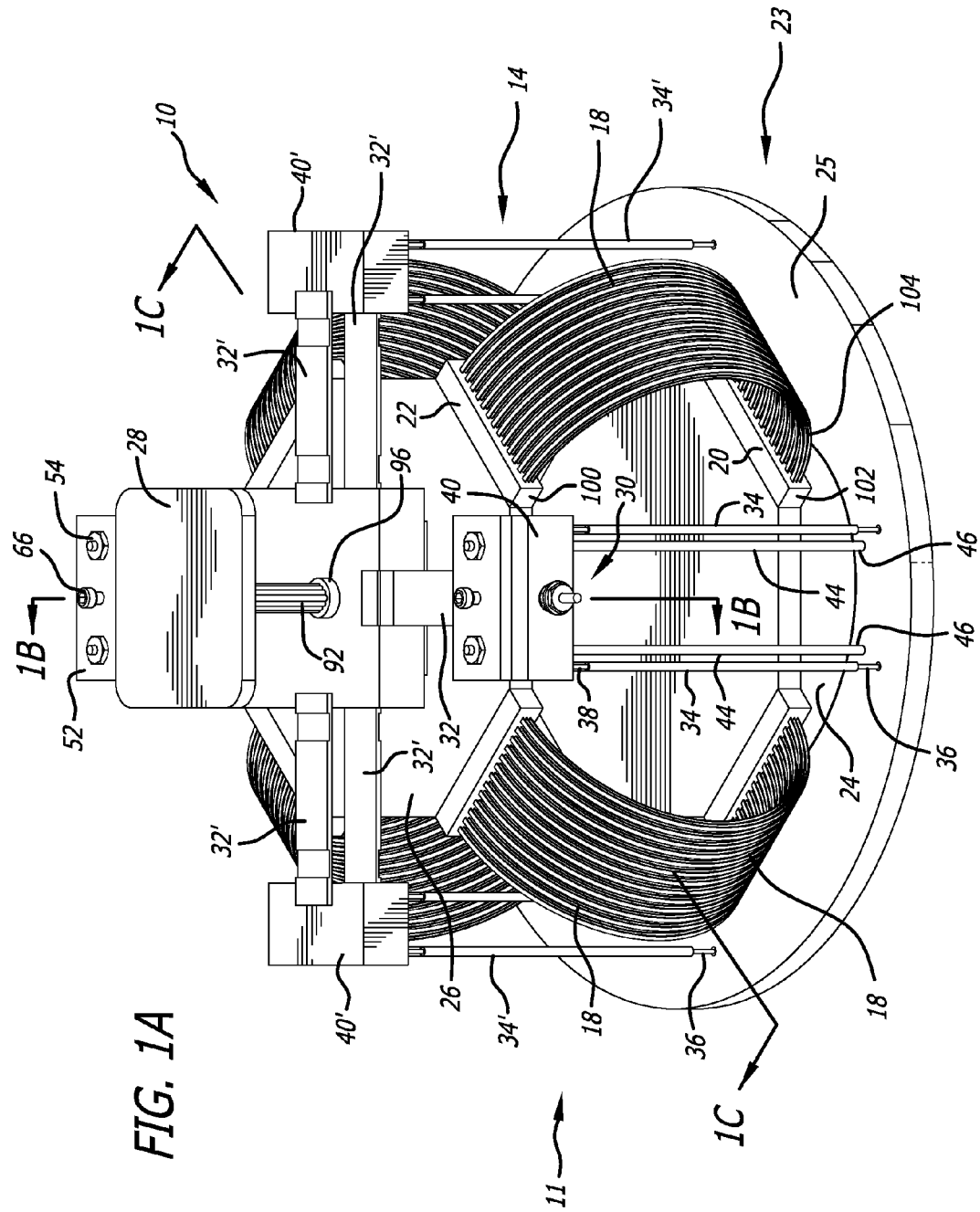
FIG. 1A is a perspective view of one embodiment of a negative-stiffness thermal strap made in accordance with the present invention.

As is shown in the drawings for purposes of illustration, the present invention is embodied in a stiffness reducing system that reduces vibrations or forces transmitted from a vibrating source on the spacecraft to a vibration-sensitive object on the spacecraft through a connection that has its stiffness reduced through the use of negative-stiffness mechanisms. As the present invention is described in detail as applied to particular negative-stiffness thermal straps or NSFCLs shown in FIGS. 1A-8, those skilled in the art will appreciate that these systems can be used with other structural components used to couple vibration-sensitive objects with a vibrating source on a spacecraft.

FIGS. 1A-3 show one embodiment of a negative-stiffness thermal strap or NSFCL 10 made in accordance with the present invention. Negative-stiffness mechanisms are coupled with conventional FCLs to reduce their stiffness and improve their structural decoupling. The FCL consists of two FCLs connected in series, a first FCL 11 and a second FCL 16, that are used to connect a vibration-sensitive object 28 with a vibrating source (not shown). The thermal strap 10 is designed to reduce the transmission of omnidirectional vibrations between the vibration sensitive object 28 and the vibrating source. The first FCL 11 is made up from a number of individual FCLs 18 that are operatively coupled with an axial negative-stiffness mechanism 30 and a transverse negative-stiffness mechanism 14.

Each FCL 18 has a first end 20 and a second end 22. Each first end 20 is connected to the inner portion 24 of a base structure 23 and each second end 22 is connected to a central hub 26. The base structure 23 has an inner portion 24 and an outer portion 25 and is designed for attachment to the vibrating and cooling source. The inner portion 24 can be connected to the cold tip of a cryocooler (not shown) and the outer portion can connected to the body of the cryocooler. The base structure 23 can be designed to minimize parasitic heat transfer between the outer portion 25 and the inner portion 24 which can be kinematically connected to provide flexibility to cope with differential thermal expansions between the warmer outer portion 25 and cooler inner portion 24 and sufficient stiffness so that the negative-stiffness mechanisms operate properly. The center hub 26 is coupled to the vibration-sensitive object 28 with the second FCL 16. As can be seen in these figures, the second FCL 16 is mounted to both the vibration-sensitive object 28 and the center hub 26. Since the first FCL with the axial negative-stiffness mechanism 30 causes the center hub 26 to be quite stiff in tilt or rotations about any transverse axis, and since structural decoupling between the vibrating cold source and the vibration-sensitive object is desired for all three translations and all three rotations, the second FCL is quite flexible in tilt so as to provide the tilt structural decoupling.

The axial negative-stiffness mechanism 30 includes transversely-oriented flexures 32 which can be compressed to create negative stiffness which will remove much or all of the axial stiffness associated with the FCLs 18. The negative-stiffness-producing mechanism 30 operates in the same manner as the particular mechanisms disclosed in my previous patents, particularly, U.S. Pat. Nos. 5,669,594 and 5,833,204.

The transverse negative-stiffness mechanism 14 comprises a number of axially oriented beam-columns 34 which are in the form of thin cylindrical rods. Each beam-column 34 includes a first end 36 secured to the base plate 24 and a second end 38 attached to a spring block 40 which forms a part of the negative-stiffness-producing mechanism 30. In the embodiment of FIGS. 1A-3, there are two spring blocks 40 associated with the negative-stiffness-producing mechanism 30. The transverse negative-stiffness mechanism 14 includes a loading mechanism 42 which provides a simple stiffness adjustment to the transverse negative-stiffness mechanism 14. The loading mechanism 42 includes a pair of support rods 44 associated with each spring block 40. Each support rod 44 includes an end 46 which extends into the outer base structure 25 and a free end 48 which extends through an opening (not shown) in the spring support 40. Each end 48 of the support rod 44 is threaded so that a nut 50 can be used as a stop for supporting a mounting plate 52. Another nut 54 located just above the mounting plate 52 maintains the mounting plate 52 secured to each support rod 44. The loading mechanism 42 further includes a compression spring 56 placed between the mounting plate 52 and the spring block 40. One end 58 of the compression spring 56 can be placed within a recess 60 found on the top surface of the spring block 40. This recess 60 helps to prevent the compression spring 56 from moving laterally once loaded. The other end 62 of the compression spring 56 is in contact with a screw mechanism 64 associated with the mounting plate 52. The screw mechanism 64 includes a turn screw 66 and an abutting structure 68 which contacts the end 62 of the compression spring 56. The turn screw 66 can includes threads that engage threads cut into an opening in the mounting plate 52. This turn screw 66 can be rotated to cause the abutting structure 68 to compress the compression spring 56 in order to develop a compressive force acting on the spring block 40, which, in turn, is transferred to each of the beam-columns 34 associated with that particular spring block 40. The turn screw 66 can be simply rotated to obtain the desired amount of compressive force needed to be applied to the beam-columns 34 in order to create the negative stiffness that will remove much or all of the transverse stiffness of the FCLs 18.

Figure 1B:
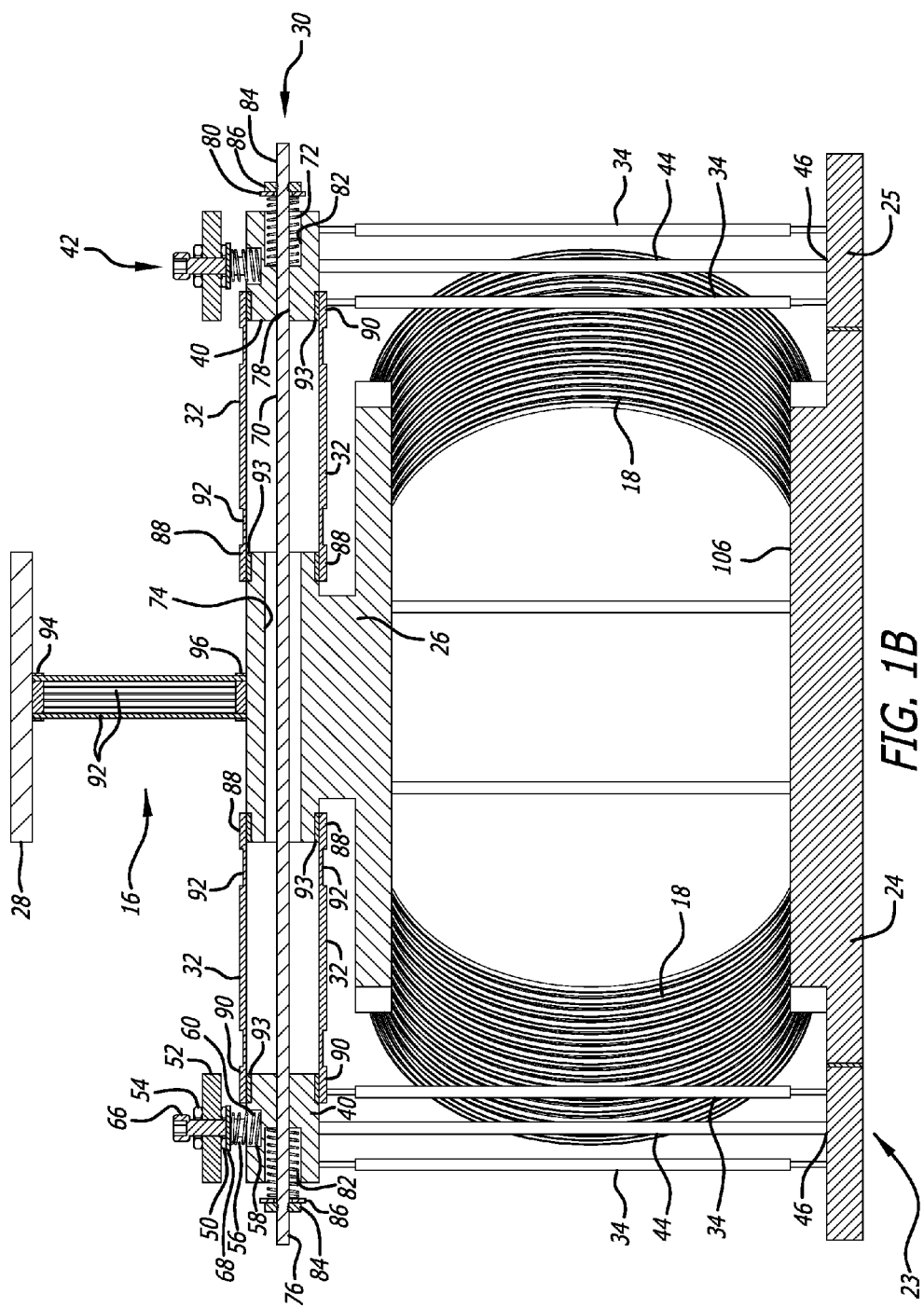
FIG. 1B is a cross-sectional view taken along line 1B-1B of FIG. 1A.
Figure 1C:
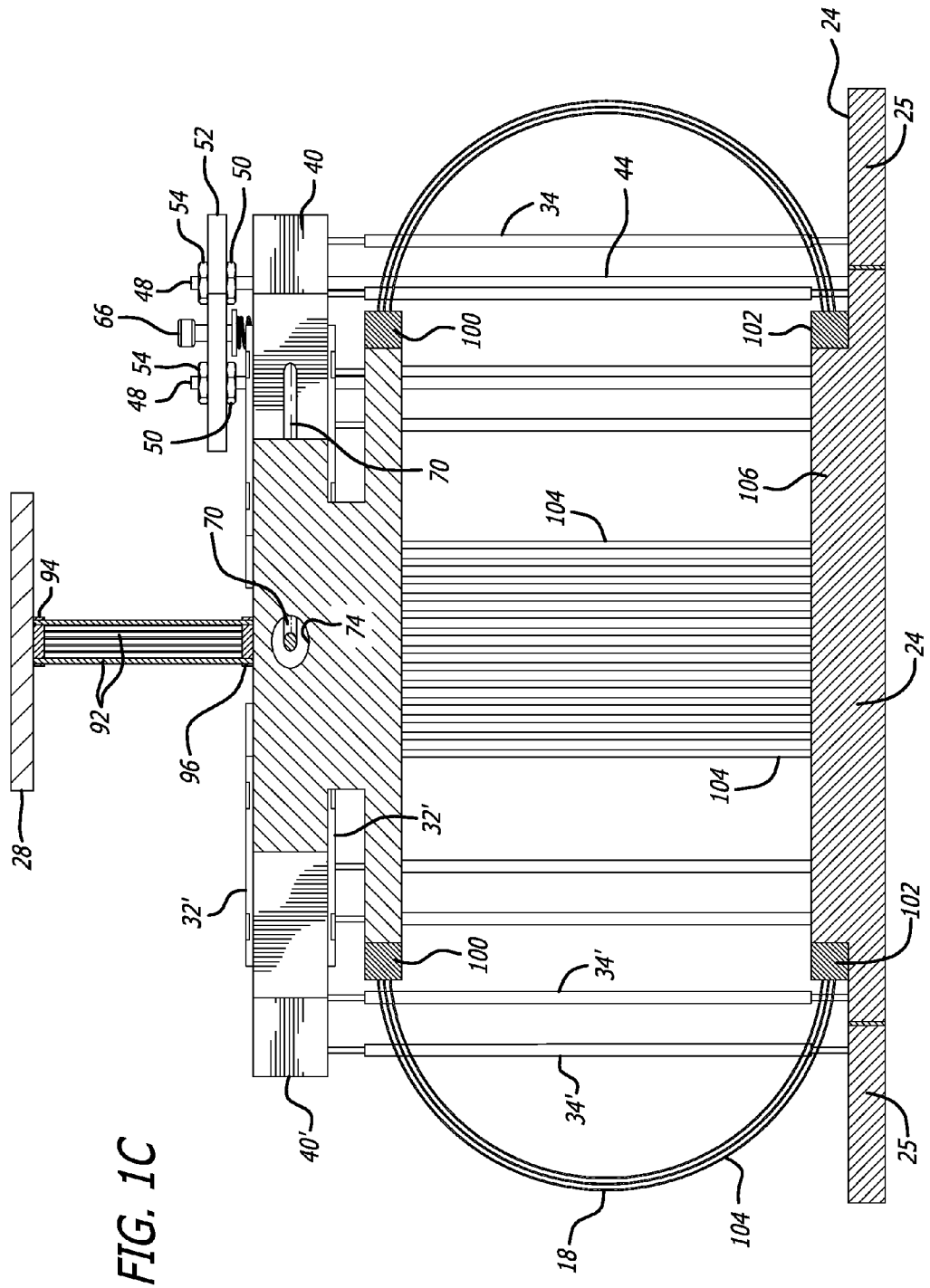
FIG. 1C is a cross-sectional view taken along line 1C-1C of FIG. 1A.
Figure 2:
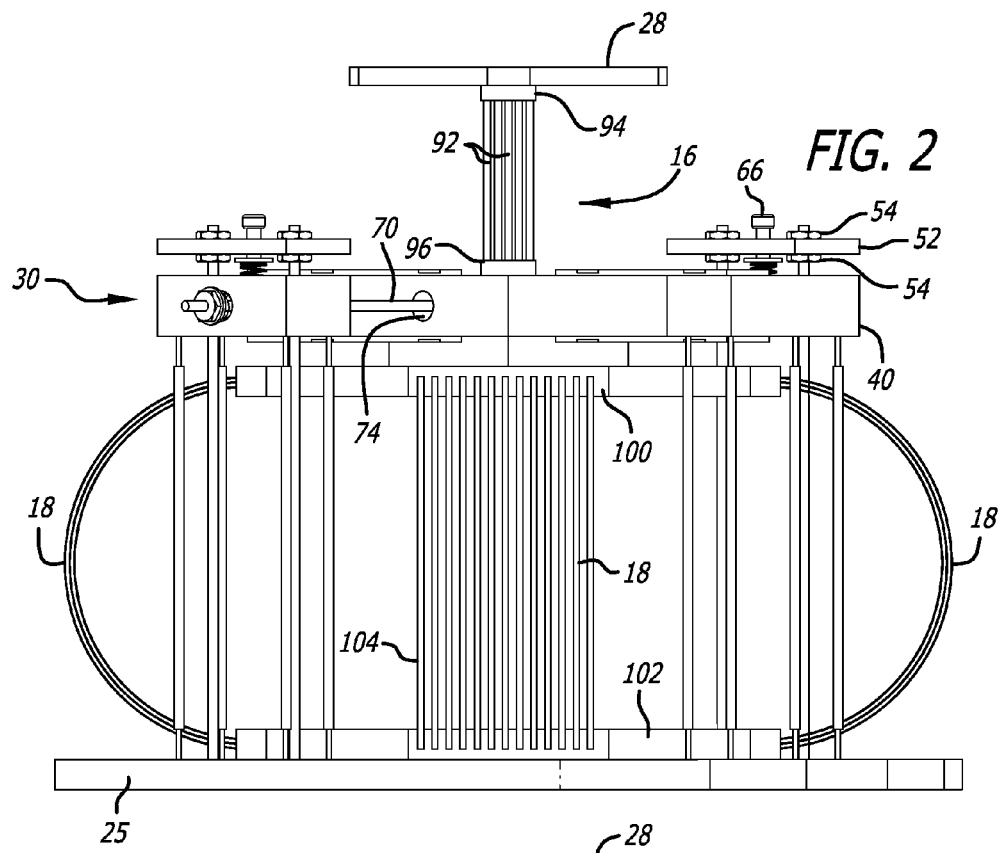
FIG. 2 is an elevational view of the negative-stiffness thermal strap shown in FIG. 1.
Figure 3:
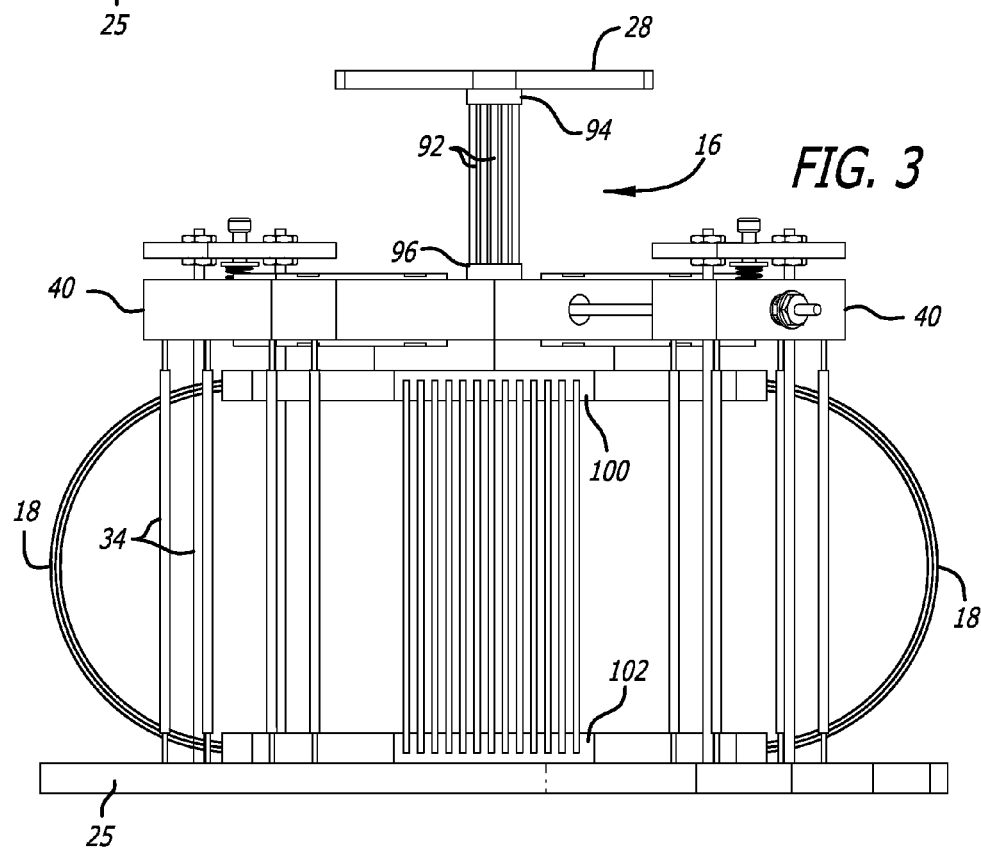
FIG. 3 is side elevational view of the negative-stiffness thermal strap shown in FIG. 1.
Figure 4:
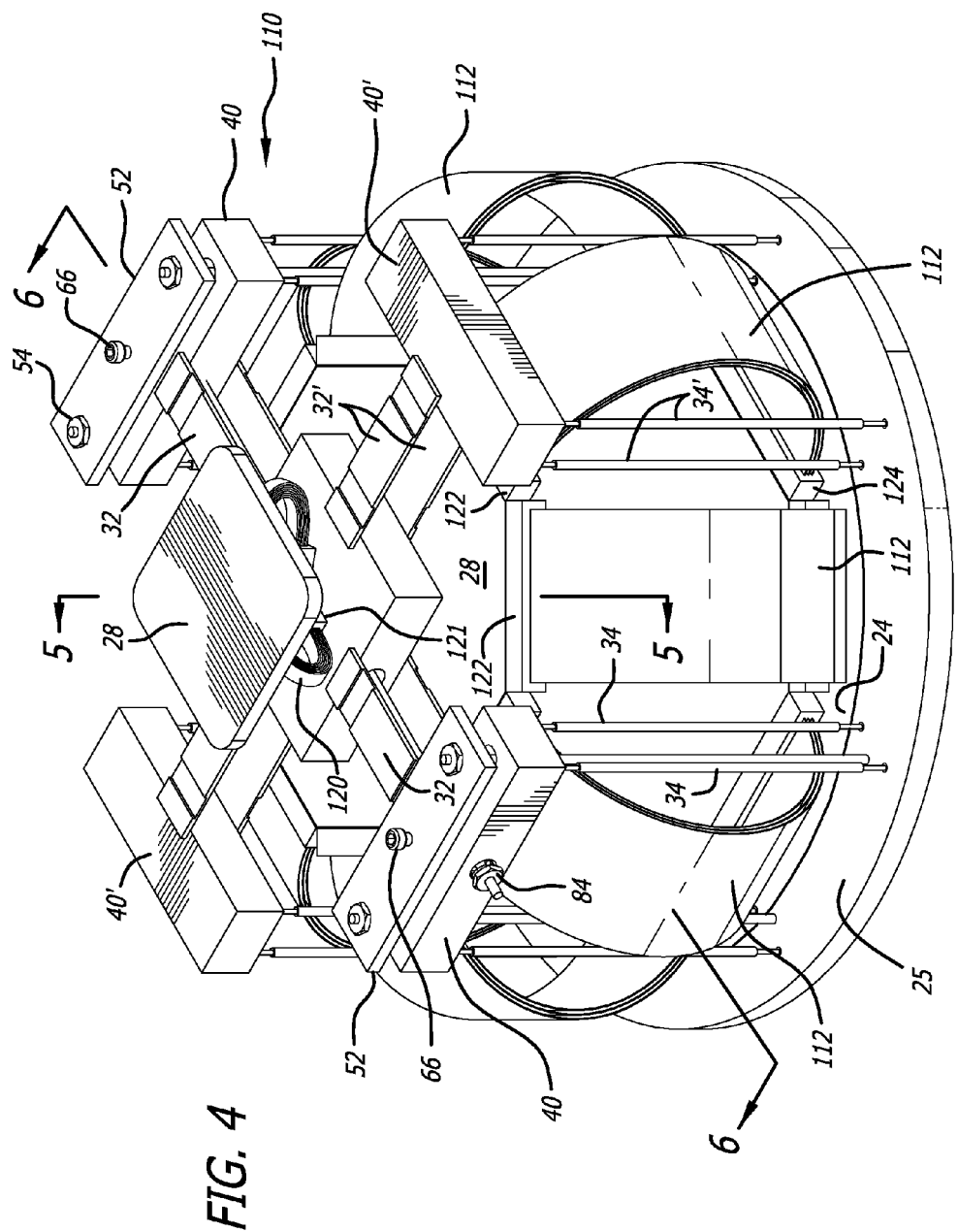
FIG. 4 is a perspective view of a different negative-stiffness thermal strap made in accordance with the present invention.
Figure 5:
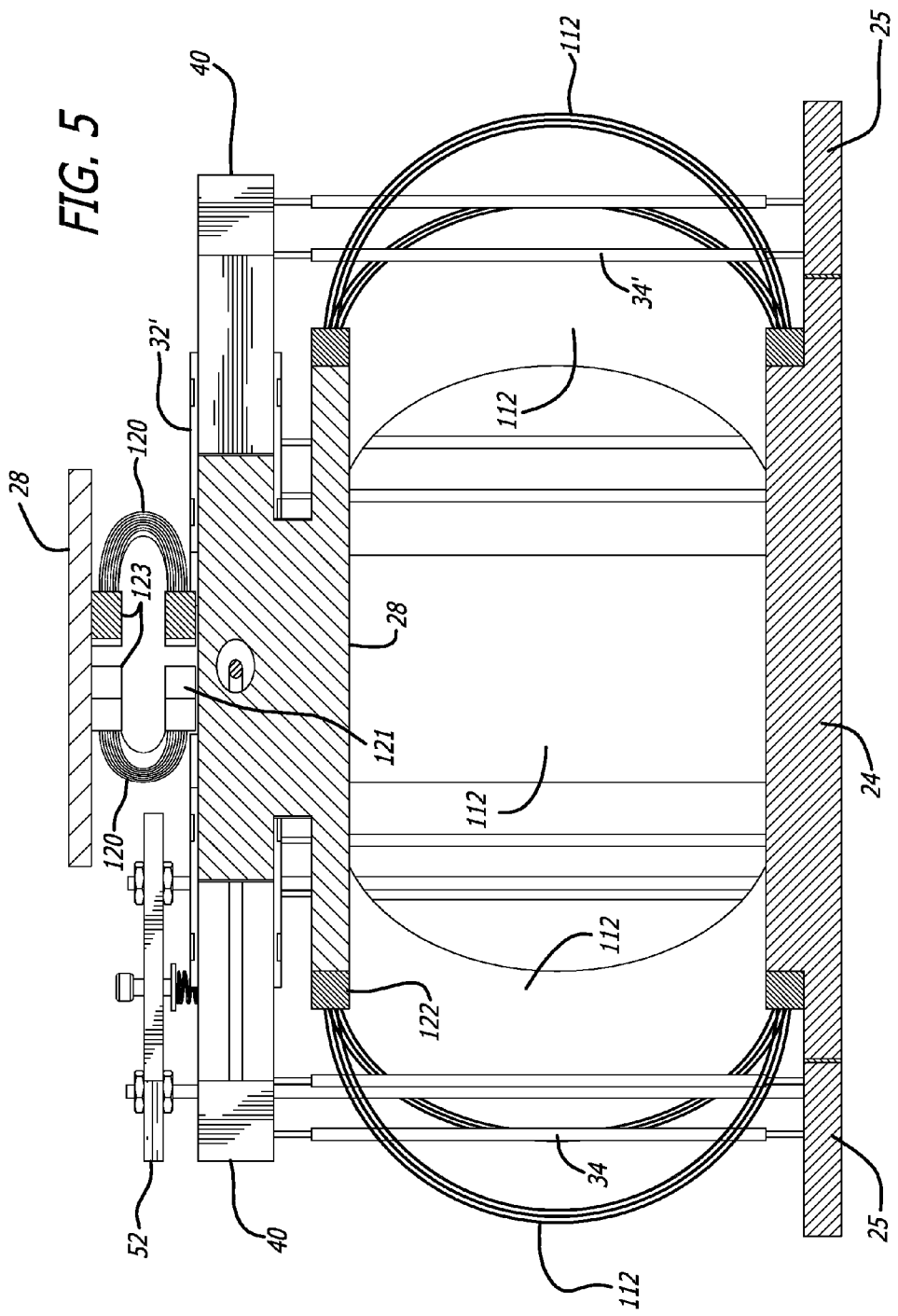
FIG. 5 is a cross-sectional view taken along line 5-5 of FIG. 4.
Figure 6:
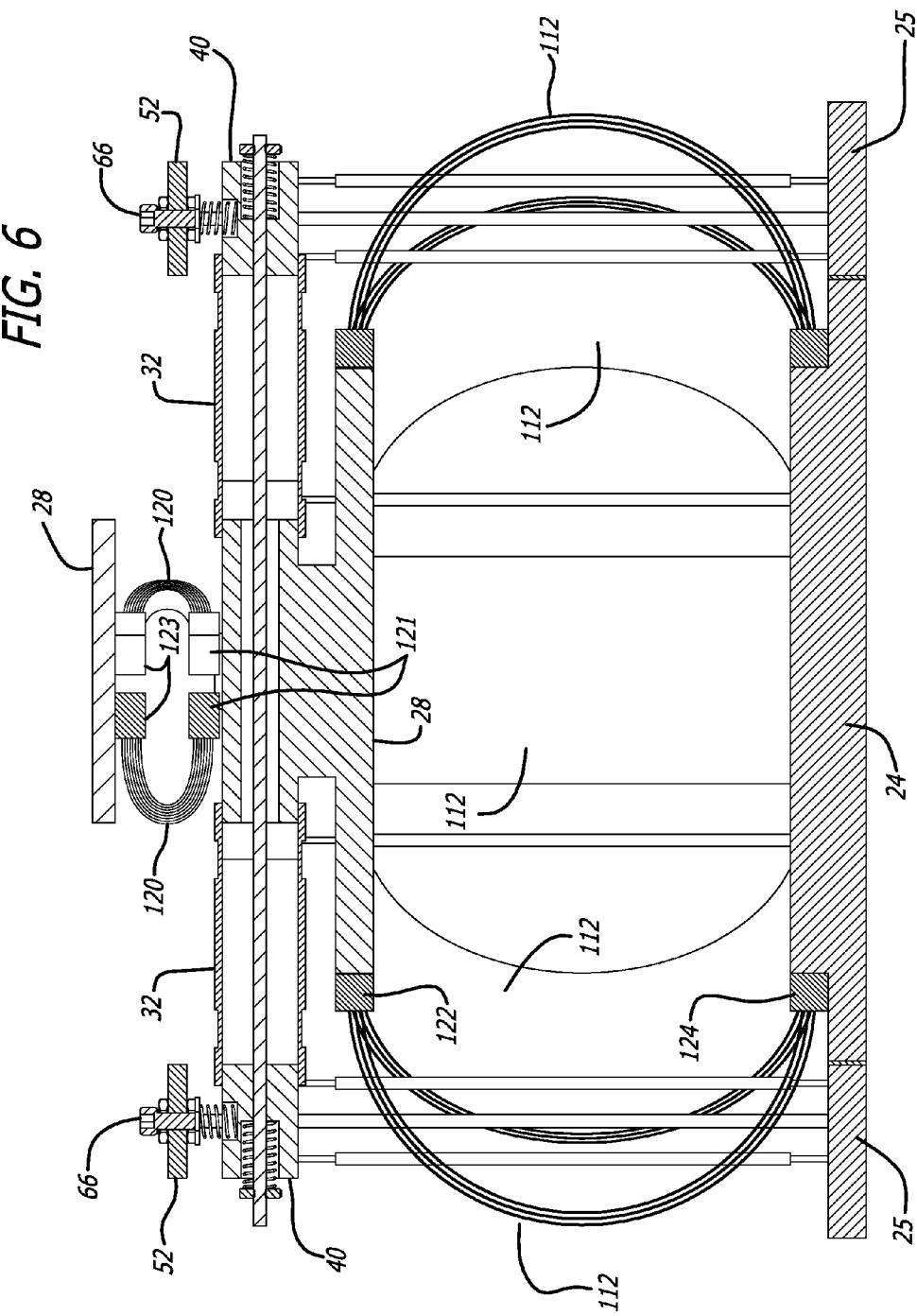
FIG. 6 is a cross-sectional view taken along line 6-6 of FIG. 4.

As can be best seen in FIGS. 1B and 1C, four notched transversely-oriented flexures 32 are attached to the center hub 26 and the spring blocks 40 and are compressed using a tension bolt 70 and a pair of compression springs 72 which form a portion of the axial negative-stiffness-producing mechanism 30. The tension bolt 70 is designed to extend through an opening 74 which extends through the center hub 26. The free ends 76 of the bolt 70 are threaded and extend through openings 78 formed in each spring block 42. Each compression spring 72 can be placed into a recessed cavity 82 formed in the spring block 42 (best seen in FIG. 1B) in order to hold the spring in place. A nut 84 and washer 86 at the threaded end 76 of the tension bolt 70 are used to squeeze each compression spring 72 against its respective spring block 40 to achieve a compressive force on each flexure 32.

Each nut 84 can be rotated accordingly to impart the needed compressive force to each of the flexures 32. Each flexure 32 has a first end 88 and a second end 90 having a notch 91 machined or otherwise formed in close proximity to these first and second ends 88, 90. Each flexure 32 is attached to the spring block 40 and center hub 26 using insulated fastening means 93. Preloading of the flexures and fine tuning of the load to adjust the negative-stiffness effect are accomplished by simply turning each nut 84, as may be needed. This arrangement of a tension bolt, die springs and fasteners is just one of a number of ways to load the flexures 32. In this manner, the axial negative-stiffness mechanism can produce negative stiffness via the compressed flexures 32 which will remove much or all of the axial stiffness associated with the FCLs 18.

The FCL 16 can be made from a plurality of thin cylindrical rods 92 press-fit into end fittings 94 and 96 which are secured to the vibration-sensitive object 28 and center hub 26. Alternatively, the FCL 16 can be made from FCL assemblies, such as those shown in FIGS. 4-8.

As can be seen in FIGS. 1A-3, this particular embodiment utilizes transversely-oriented flexures 32 which are connected to negative-stiffness-producing mechanisms 30 and transverseley-oriented flexures 32' which are free standing and not connected to a negative-stiffness-producing mechanism. Likewise, there are beam-columns 34 which are connected to loading mechanisms 42 and other sets of beam-columns 34' which stand alone. These "free standing" flexures 32' and beam-columns 34' are utilized to provide additional lateral stability to the composite system. Alternatively, these free standing flexures 32' and beam-columns 34' could be attached to negative-stiffness-producing mechanisms, if desired.

The negative-stiffness thermal strap 10 utilizes conventional FCLs 16 and 18 to provide a strong thermal link between the cooling source (the vibration source) and the vibration-sensitive object 28, and additional structures that include the center hub 26, the negative-stiffness mechanisms 30 and 14 and the base structures 24 and 25. The center hub 26 and inner base structure 24 are part of the main thermal path between the cooling source and the vibration-sensitive object 28 and are designed to provide strong thermal coupling and sufficient stiffness and strength as well as minimum mass to cope with launch loads. In this embodiment of the invention the center hub 26 is thermally insulated from the negative-stiffness mechanisms 30 and 14 and the negative-stiffness mechanism 14 is thermally insulated from the inner base structure 24. This is to minimize parasitic heat transfer from the negative stiffness mechanisms 30 and 14 and the outer base structure 25. All the components of the negative-stiffness mechanisms 30 and 14 are designed for sufficient stiffness and strength so they operate properly and for minimum mass to cope with launch loads. The entire negative-stiffness thermal strap 10 is also designed so that its structural resonances avoid the primary vibration frequencies of the vibrating cooling source such as a cryocooler as well as harmonics associated with the primary vibrating frequencies.

FCLs 16 and 18 are flexible yet thermally conductive so as to provide the simplest and most prevalent devices in cryogenic integration. They provide mechanical flexibility to cope with launch loads and/or differential thermal expansion stresses while still providing a strong thermal link. In the particular embodiment shown in FIGS. 1A-3, each FCL 18 is made with two rigid end pieces 100 and 102 and a number of small diameter wires 104. An FCL also can be composed of multiple thin layers of foil, such as the one described below and depicted in FIGS. 4-8. Each of the end pieces 100 of the individual FCLs shown in FIGS. 1A-3 is attached to the center hub 26 using suitable connectors. In this regard, the particular shape of the hub 26 could be made to accommodate the end pieces 100 of each FCL 18, as is shown in FIG. 1A. Likewise, the other end piece 102 of each FCL 18 is attached to the inner base structure 24. In this regard, the inner base structure 24 could have a raised region 106 used as an abutment for attaching the end piece 102 thereto. This raised region 106 could be shaped to receive each end piece 102. It should be appreciated that the attachment of these end pieces 100 and 102 are just one of a number of ways to attach the FCLs 18 in the negative-stiffness thermal strap 10. There are also a number of ways the center hub 26 and the base structures 23 and 24 could be constructed. The center hub 26 and the inner base structure 24 could be plates with lightening holes made from very high thermal conduction materials such as pure copper or pure aluminum. The outer base structure 25 could be of a frame or truss construction made with high strength-to-weight structural metal alloys or structural materials having low thermal conductivities. Similarly, the components in the negative-stiffness mechanisms 16 and 30 could be made from high strength-to-weight structural metal alloys or structural materials having low thermal conductivities.

Referring now to FIGS. 4-8, another embodiment of a negative-stiffness thermal strap 110 is disclosed. This negative-stiffness thermal strap 110 utilizes the same basic components used in conjunction with the embodiment of FIGS. 1A-3. However, in this embodiment, the FCLs 112 used with the negative-stiffness thermal strap is a foil-type FCL described above. As can be seen in FIGS. 4-8, the arrangement of the FCLs relative to each other and the negative-stiffness mechanisms 30 and 14 is somewhat different. For example, there is an FCL 112 directly located beneath each spring block 42 used in the negative-stiffness thermal strap 110. FCLs are also located adjacent to each spring block 42 resulting in a total of eight FCLs used with this particular embodiment. This embodiment shows how a different number of FCLs can be used and arranged relative to the components of the negative-stiffness thermal strap. It should be appreciated that the number, type and arrangement of FCLs can be varied without departing from the spirit and scope of the present invention.

The second FCL 16 used with this particular embodiment, that also provides tilt structural decoupling between the vibrating source and the vibration-sensitive object 28, is also different from the FCL 16 used on the embodiment of FIGS. 1A-3. As can be best seen in FIGS. 5-8, the FCL 16 is made from three foil-type FCLs 120 with rigid end pieces 121 and 123 which connect the center hub 26 to the vibration-sensitive object 28. End pieces 121 connect to the center hub 26 and end pieces 23 connect to the vibration-sensitive object 28. Each FCL 120 has a substantial U shape and can be arranged in a circular pattern approximately 120° relative to each other. This construction makes the FCL 16 flexible in tilt in order to provide effective tilt structural decoupling between the vibrating source and the vibration-sensitive object 28 and also provide strong thermal coupling between the center hub 26 and the vibration-sensitive object 28.

The FCLs 112 used with the embodiment of FIGS. 4-8 utilize two rigid end pieces 122 and 124 and multiple layers 126 of thin foil. The particular FCL 112 depicts a standard foil FCL which can be used in accordance with the present invention. It should be appreciated that the size, shape and makeup of the FCL used in accordance with the present invention is not limited to the particular FCLs depicted in FIGS. 1A-8, but could include any one of a number of FCLs. Additionally, the embodiments disclosed herein utilize a pair of beam-columns to support one end of each spring block. Accordingly, four beam-columns are shown to support each spring block. It should be noted that more of less beam-columns could be utilized to support each spring block without departing from the spirit and scope of the present invention.

The FCLs and elements in the main thermal path such as the center hub and the inner base structure can be made from materials having high thermal conductivity such as pure aluminum and pure copper, and the elements making up the negative-stiffness mechanisms can be made from high strength-to-weight structural materials such as aluminum and titanium alloys. Other structural materials having suitable strength, elastic, thermal and mass properties can also be used.

While one particular form of the invention has been illustrated and described, it will be apparent that various modifications can be made without departing from the spirit and scope of the invention. Accordingly, it is not intended that the invention be limited, except by the attached claims.

I claim:

1. A negative-stiffness thermal strap system comprising:
a thermal strap which provides thermal coupling and structural decoupling between a vibration-sensitive object and a vibrating cooling source, the thermal strap having positive stiffness; and
at least one negative-stiffness-producing mechanism which is connected to the thermal strap and adds negative stiffness to the system so as to offset some of the positive stiffness of the thermal strap so that the overall stiffness of the system is reduced.

2. The negative-stiffness thermal strap system of claim 1, wherein the thermal strap has positive axial stiffness and positive transverse stiffness and one of the at least one negative-stiffness producing mechanism adds negative stiffness to offset some of the positive axial stiffness of the thermal strap.

3. The negative-stiffness thermal strap system of claim 1, wherein the thermal strap has positive axial stiffness and positive transverse stiffness and the at least one negative-stiffness producing mechanism adds negative stiffness to offset some of the positive transverse stiffness of the thermal strap.

4. The negative-stiffness thermal strap system of claim 2, wherein one of the at least one negative-stiffness producing mechanisms adds negative stiffness to offset some of the positive transverse stiffness of the thermal strap.

5. The negative-stiffness thermal strap system of claim 1 wherein the thermal strap is comprised of at least two thermal straps connected in series and one of the thermal straps provides structural decoupling between the vibration-sensitive object and the vibrating cooling source for rotations about any transverse axis, and the at least one negative-stiffness producing mechanism adds negative stiffness to offset some of the positive stiffness of one or both of the at least two thermal straps.

6. The negative-stiffness thermal strap system of claim 5 wherein the thermal strap has positive axial stiffness and positive transverse stiffness and the negative-stiffness producing mechanism adds negative stiffness to offset some of the positive axial stiffness of the thermal strap.

7. The negative-stiffness thermal strap system of claim 5 wherein the thermal strap has positive axial stiffness and positive transverse stiffness and the negative-stiffness producing mechanism adds negative stiffness to offset some of the positive transverse stiffness of the thermal strap.

8. The negative-stiffness thermal strap system of claim 2, wherein the axial-negative-stiffness-producing mechanism includes at least one axially-compressed flexure that is oriented in a transverse direction.

9. The negative-stiffness thermal strap system of claim 3, wherein the transverse negative-stiffness-producing mechanism includes a plurality of axially compressed beam-columns oriented in an axial direction.

10. The negative-stiffness thermal strap system of claim 1, wherein the at least one negative-stiffness-producing mechanism is thermally isolated from the thermal strap.

11. The negative-stiffness thermal strap system of claim 1, wherein the at least one negative-stiffness-producing mechanism is made from a material that has relatively low thermal conductivity relative to the material used to make the thermal strap.

12. The negative-stiffness thermal strap system of claim 1 wherein the thermal strap is comprised of a plurality of thermal straps, each thermal strap having positive axial stiffness and positive transverse stiffness.

13. A negative-stiffness flexible conductive link system which provides thermal coupling between a vibration-sensitive object and a vibrating cooling source, comprising:
  a plurality of flexible conductive links, each flexible conductive links having positive axial stiffness and positive transverse stiffness, the plurality of flexible links cooperating to attain a composite positive axial stiffness and a composite positive transverse stiffness;
  an axial negative-stiffness-producing mechanism which adds negative stiffness to offset some of the composite positive axial stiffness of the flexible conductive links; and
  a transverse negative-stiffness-producing mechanism which adds negative stiffness to offset some of the composite positive transverse stiffness of the flexible conductive links.

14. The negative-stiffness flexible conductive link system of claim 13 and including at least one additional flexible conductive link connected in series with the plurality of flexible conductive links, wherein the at least one additional flexible conductive link provides structural decoupling between the vibration sensitive object and the vibrating cooling source for rotations about any transverse axis.

15. The negative-stiffness flexible conductive link system of claim 13, wherein the axial negative-stiffness-producing mechanism includes at least one flexure that is oriented in a transverse direction and is coupled to the plurality of flexible conductive links, and the negative-stiffness-producing mechanism is designed to apply a compressive force on the at least one flexure.

16. The negative-stiffness flexible conductive link system of claim 13, wherein the transverse negative-stiffness-producing mechanism includes a plurality of axially compressed beam-columns oriented in the axial direction.

17. The negative-stiffness flexible conductive link system of claim 14, wherein the at least one additional flexible conductive link is comprised of a plurality of flexible conductive links.

18. The negative-stiffness flexible conductive link system of claim 13, wherein the axial negative-stiffness-producing mechanism and the transverse negative-stiffness-producing mechanism are thermally isolated from the conductive links.

19. The negative-stiffness flexible conductive link system of claim 13, wherein the axial negative-stiffness-producing mechanism and the transverse negative-stiffness-producing mechanism are made from materials that have relatively low thermal conductivity relative to the material used to make the conductive links.

* * * * *